(12) United States Patent
Lu et al.

(10) Patent No.: US 12,520,398 B2
(45) Date of Patent: Jan. 6, 2026

(54) LIGHTING DEVICE HAVING HARMONIC SUPPRESSING FUNCTION

(71) Applicant: Xiamen PVTECH Co., Ltd., Fujian (CN)

(72) Inventors: Fuxing Lu, Fujian (CN); Zhirong Lin, Fujian (CN)

(73) Assignee: Xiamen PVTECH CO., Ltd., Xiamen (CN)

( * ) Notice: Subject to any disclaimer, the term of this patent is extended or adjusted under 35 U.S.C. 154(b) by 72 days.

(21) Appl. No.: 18/434,847

(22) Filed: Feb. 7, 2024

(65) Prior Publication Data

US 2025/0185135 A1   Jun. 5, 2025

(30) Foreign Application Priority Data

Dec. 1, 2023  (CN) .......................... 202311648991.X

(51) Int. Cl.
*H05B 45/36* (2020.01)
(52) U.S. Cl.
CPC ..................................... *H05B 45/36* (2020.01)
(58) Field of Classification Search
CPC ........ H05B 45/30; H05B 45/36; H05B 45/38; H05B 45/355; H05B 45/375; H05B 45/385
See application file for complete search history.

(56) References Cited

U.S. PATENT DOCUMENTS

| | | | | |
|---|---|---|---|---|
| 8,664,883 B2* | 3/2014 | Hiramatu | ............... | H05B 47/16 315/308 |
| 8,710,745 B1* | 4/2014 | Chang | .................... | H05B 45/59 315/120 |
| 2008/0084168 A1* | 4/2008 | Lu | ........................ | H05B 41/282 315/247 |
| 2012/0019714 A1* | 1/2012 | Hiramatu | ............... | H05B 47/16 348/370 |
| 2013/0293151 A1* | 11/2013 | Puvanakijjakorn | .. | H05B 45/385 315/297 |
| 2013/0320872 A1* | 12/2013 | Li | ........................ | H05B 45/382 315/201 |
| 2014/0042905 A1* | 2/2014 | Lee | .................... | H05B 45/3725 315/85 |

(Continued)

FOREIGN PATENT DOCUMENTS

| CN | 102215615 A | 10/2011 |
|---|---|---|
| CN | 104735853 A | 6/2015 |

(Continued)

*Primary Examiner* — Tung X Le
(74) *Attorney, Agent, or Firm* — Bruce Stone LLP; Joseph A. Bruce

(57) ABSTRACT

A lighting device having hormonic suppressing function includes an input module, hormonic suppressing module, a rectifying module, a filtering module, a voltage converting module and a light source module. The hormonic suppressing module is connected to the input module, and includes an inductor a capacitor and a thermistor. The rectifying module is connected to the hormonic suppressing module. The filtering module is connected to the rectifying module. The voltage converting module is connected to the filtering module. The light source module is connected to the voltage converting module. The hormonic suppressing module is disposed between the input module and the rectifying module.

8 Claims, 3 Drawing Sheets

(56) References Cited

U.S. PATENT DOCUMENTS

2014/0191659 A1* 7/2014 Wu ..................... H05B 45/46
                                                                315/53

FOREIGN PATENT DOCUMENTS

| CN | 210129818 U | 2/2020 |
|----|-------------|--------|
| CN | 114123741 A | 3/2022 |
| JP | 2008-131743 A | 6/2008 |

\* cited by examiner

LIGHTING DEVICE HAVING HARMONIC SUPPRESSING FUNCTION

BACKGROUND OF THE INVENTION

1. Field of the Invention

The present invention relates to a lighting device, in particular to a lighting device having harmonic suppressing function.

2. Description of the Prior Art

To meet the demands of industrial production, a large number of large devices are connected to the power grid, which causes serious impacts on the quality of the power grid and results in the generation of high-frequency harmonics, leading to severe distortion of the power grid waveform and the occurrence of serious harmonic superposition phenomena. When high-frequency harmonics pass through filtering capacitors, the fuse may be blown accordingly. At the same time, as the drivers of lighting devices are influenced by long-term exposure to high-frequency harmonics, the service lives of these drivers may be reduced. Furthermore, high-frequency harmonics can cause an increase in the temperatures of capacitors, which may result in unexpected accidents, such as fires.

Some currently available harmonic suppressing circuits usually adopt inductors disposed at the input ends thereof so as to achieve harmonic suppressing functions. However, these large inductors having high inductances significantly increase the overall costs of the circuits and cannot meet the requirements of radiation and conduction.

Some currently available harmonic suppressing circuits relocate all capacitors before the rectifier to after the rectifier, which can to some extent suppress harmonic interference. However, if high-frequency harmonics pass through the rectifier, the diodes of the rectifier may be broken down due to overheating.

In addition, some currently available harmonic suppressing circuits adopt active filters to eliminate harmonics, but this significantly increases the costs thereof.

China Patent Publication No.: CN110829809A and U.S. Patent Publication No.: US20100052432A1 disclose harmonic suppressing technologies, but these technologies still cannot effectively solve the above problems.

SUMMARY OF THE INVENTION

One embodiment of the present invention provides a lighting device having harmonic suppressing function, which includes an input module, a, harmonic suppressing module, a rectifying module, a filtering module, a voltage converting module and a light source module. The harmonic suppressing module is connected to the input module, and includes an inductor, a capacitor, and a thermistor. The rectifying module is connected to the harmonic suppressing module. The filtering module is connected to the rectifying module. The voltage converting module is connected to the filtering module. The light source module is connected to the voltage converting module. The harmonic suppressing module is disposed between the input module and the rectifying module.

In one embodiment, the inductance of the inductor is between 1000 nH and 1 mH.

In one embodiment, the input module includes a live wire terminal and a neutral wire terminal.

In one embodiment, one end of the inductor is connected to the live wire terminal and the other end of the inductor is connected to a first node. The first node is connected to one end of the capacitor and the rectifying module and the other end of the capacitor is connected to one end of the thermistor. The other end of the thermistor is connected to a second node, and the second node is connected to the neutral wire terminal and the rectifying module.

In one embodiment, the rectifying module has a first end, a second end, a third end and a fourth end. The first end is connected to the first node; the second end is connected to the second node; the third end is connected to the filtering module; the fourth end is connected to a grounding point.

In one embodiment, the input module is connected to an external power source.

In one embodiment, the light source module is a light-emitting diode (LED) or a LED array.

In one embodiment, the harmonic suppressing module is connected to the input module via a fuse.

In one embodiment, the voltage converting module is a boost converter, a buck converter, a buck-boost converter or a flyback converter.

In one embodiment, the voltage converting module is one of a boost converter, a buck converter, a buck-boost converter and a flyback converter, or the combination of two or more of the boost converter, the buck converter, the buck-boost converter and the flyback converter.

The lighting device having harmonic suppressing function in accordance with the embodiments of the present invention may have the following advantages:

(1) In one embodiment of the present invention, the lighting device having harmonic suppressing function includes an input module, harmonic suppressing module, a rectifying module, a filtering module, a voltage converting module and a light source module. The harmonic suppressing module is connected to the input module, and includes an inductor a capacitor and a thermistor. The rectifying module is connected to the harmonic suppressing module. The filtering module is connected to the rectifying module. The voltage converting module is connected to the filtering module. The light source module is connected to the voltage converting module. The harmonic suppressing module is disposed between the input module and the rectifying module. The above harmonic suppressing module is disposed between the input module and the rectifying module, and disposed before the rectifying module, so the harmonic suppressing module can effectively suppress harmonics to prevent damage to the functional modules of the lighting device. Therefore, the harmonic suppressing module can extend the service life of the lighting device and prevent unexpected accidents, such as fires, from being incurred.

(2) In one embodiment of the present invention, the harmonic suppressing module of the lighting device includes an inductor, a capacitor, and a thermistor. The inductor effectively suppresses high-frequency harmonics. When high-frequency harmonics pass through the inductor, the high-frequency harmonics return to the input module after passing through the capacitor and thermistor. If severe high-frequency harmonics are generated, the resistance of the thermistor increases to consume the high-frequency harmonics. This automatic adjustable harmonic suppression mechanism effectively suppresses the high-frequency harmonics in order to preventing the high-frequency harmonics from affecting the functional modules of the lighting device. As a result, the service life of the lighting device can be further extended, such that the lighting device can achieve higher reliability.

(3) In one embodiment of the present invention, the inductance of the inductor in the harmonic suppressing module of the lighting device ranges from 1000 nH to 1 mH. Therefore, the inductance of the inductor of the harmonic suppressing module can be low, so the inductor can be of small size, which can significantly reduce the cost of the harmonic suppressing module, and conform to the requirements of radiation and conduction and allows. Accordingly, the lighting device can be more comprehensive in use and satisfy actual requirements.

(4) In one embodiment of the present invention, the harmonic suppressing module of the lighting device can use an inductor with low inductance. Consequently, the inductor does not adversely affect the overall efficiency of the lighting device, such that the lighting device can achieve high effectiveness. Additionally, the inductor can provide an effective harmonic suppressing effect. Therefore, the lighting device can meet the requirements of different applications.

(5) In one embodiment of the present invention, the lighting source module of the lighting device can be a light-emitting diode (LED), so the energy consumption of the lighting device can be reduced and the lighting device can also achieve high efficiency. Thus, the lighting device can be more energy-saving in order to meet environmental protection requirements and conform to future development trends.

(6) In one embodiment of the present invention, the circuit design of the lighting device is simple, so the lighting device can achieve the desired technical effects while effectively reducing the cost thereof. Therefore, the lighting device can have high practicality and meet the needs of different users.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
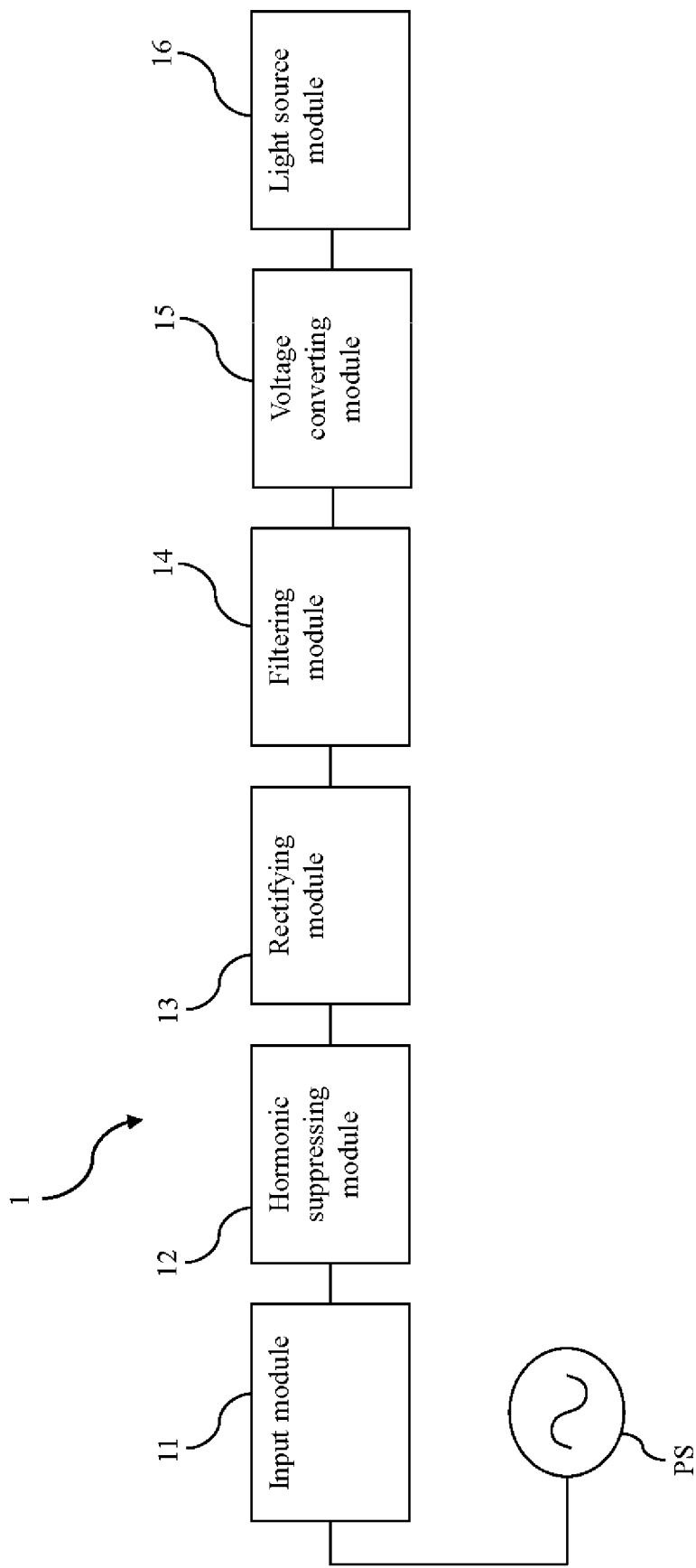
FIG. 1 is the block diagram of the circuit structure of the lighting device with harmonic suppression function in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the block diagram of the circuit structure of the lighting device with harmonic suppression function in accordance with the first embodiment of the present invention. As shown in FIG. 1, the lighting device 1 includes an input module 11, a harmonic suppressing module 12, a rectifying module 13, a filtering module 14, a voltage converting module 15, and a lighting source module 16.

The harmonic suppressing module 12 is connected to the input module 11. The input module 11 is connected to an external power source PS. In this embodiment, the external power source PS is a utility power. In another embodiment, the external power source PS can be a generator or other similar devices.

The rectifying module 13 is connected to the harmonic suppressing module 12. In this embodiment, the rectifying module 13 is a bridge rectifier. In another embodiment, the rectifying module 13 can be a half-wave rectifier or other similar components.

The filtering module 14 is connected to the rectifying module 13. In this embodiment, the filtering module 14 may include a filtering circuit, an electromagnetic compatibility (EMC) circuit, and other necessary circuits. In another embodiment, the filtering module 14 may only have a filtering circuit. The circuit of the filtering module 14 can be designed according to actual needs with a view to meeting the requirements of different applications.

The voltage converting module 15 is connected to the filtering module 14. In this embodiment, the voltage converting module 15 can be a boost converter, buck converter, buck-boost converter, flyback converter, or other similar components. In another embodiment, the voltage converting module 15 can be the combination of two or more of a boost converter, buck converter, buck-boost converter, and flyback converter.

The lighting source module 16 is connected to the voltage converting module 15. In this embodiment, the lighting source module 16 is a light-emitting diode (LED). In another embodiment, the lighting source module 16 can be a LED array or other similar components.

As described above, the harmonic suppressing module 12 is disposed between the input module 11 and the rectifying module 13. In this way, the harmonic suppressing module 12 effectively suppresses high-frequency harmonics in order to prevent the functional modules of the lighting device 1 from being damaged. Therefore, the harmonic suppressing module 12 can effectively extend the service life of the lighting device 1 and prevent unexpected accidents, such as fires, from being incurred.

Additionally, the harmonic suppressing module 12 may include an inductor. The inductance of the inductor is below 1 mH. For example, the inductance of the inductor can be between 1000 nH and 1 mH. Therefore, the harmonic suppressing module 12 can use an inductor with low inductance, and the small size of this inductor significantly reduces the cost of the lighting device 1, which can also meet the requirements of radiation and conduction. Consequently, the application of the lighting device 1 can be more comprehensive in order to meet actual requirements.

The embodiment just exemplifies the present invention and is not intended to limit the scope of the present invention; any equivalent modification and variation according to the spirit of the present invention is to be also included within the scope of the following claims and their equivalents.

Figure 2:
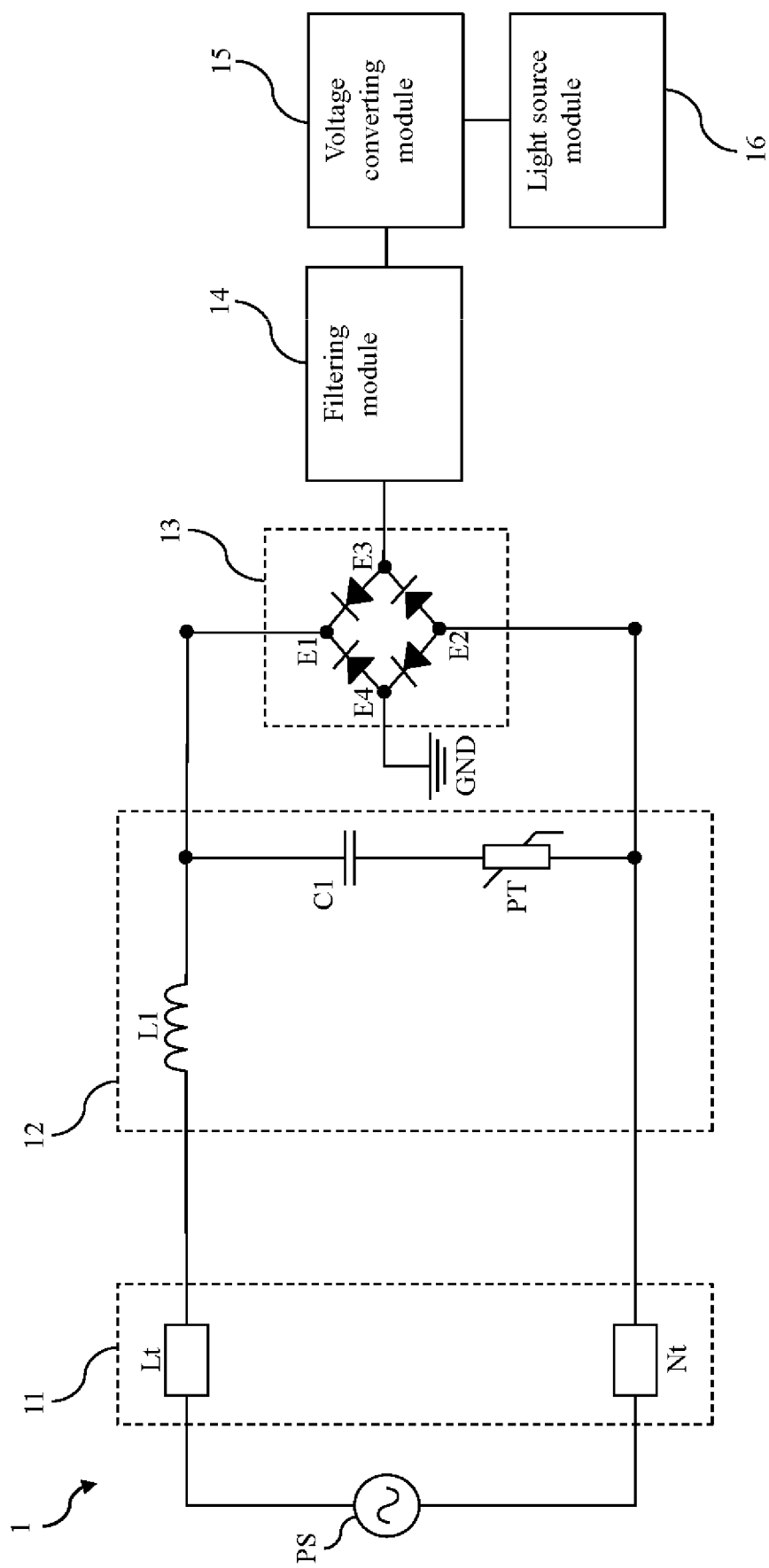
FIG. 2 is the circuit diagram of the circuit structure of the lighting device with harmonic suppression function in accordance with the second embodiment of the present invention.

Please refer to FIG. 2, which is the circuit diagram of the circuit structure of the lighting device with harmonic suppression function in accordance with the second embodiment of the present invention. As shown in FIG. 2, the lighting device 1 includes an input module 11, a harmonic suppressing module 12, a rectifying module 13, a filtering module 14, a voltage converting module 15, and a lighting source module 16.

The input module 11 includes a live wire terminal Lt and a neutral wire terminal Nt. The live wire terminal Lt and the neutral wire terminal Nt are connected to an external power source PS. In this embodiment, the external power source PS is a utility power. In another embodiment, the external power source PS can be a generator or other similar components.

The harmonic suppressing module 12 is connected to the input module 11. The harmonic suppressing module 12 includes an inductor L1, a capacitor C1, and a thermistor PT. One end of the inductor L1 is connected to the live wire terminal Lt, and the other end is connected to the first node N1. The first node N1 is connected to one end of the capacitor C1. The other end of the capacitor C1 is connected to one end of the thermistor PT, and the other end of the thermistor PT is connected to the second node N2. The second node N2 is connected to the neutral wire terminal Nt. The thermistor PT can be a PTC (positive temperature coefficient) thermistor or a component whose resistance increases with temperature. The capacitance of the capacitor C1 can be adjusted according to the power of the lighting source module 16, and the capacitance (nF) of the capacitor C1 is approximately 10 times the power (W) of the lighting source module 16. For example, if the power of the lighting source module 16 is 10 W, the capacitance of the capacitor C1 is approximately 100 nF. If the power of the lighting source module 16 is 20 W, the capacitance of the capacitor C1 is approximately 220 nF or less. If the power of the lighting source module 16 is 50 W, the capacitance of the capacitor C1 is approximately 470 nF or less.

The rectifying module 13 can be a bridge rectifier. The rectifying module 13 has a first end E1, a second end E2, a third end E3, and a fourth end E4. The first end E1 of the rectifying module 13 is connected to a first node N1, the second end E2 is connected to a second node N2, the third end E3 is connected to the filtering module 14, and the fourth end E4 is connected to a grounding point GND.

The filtering module 14 is connected to the rectifying module 13. The filtering module 14 may include a filtering circuit, an electromagnetic compatibility (EMC) circuit, and other necessary circuits. In another embodiment, the filtering module 14 may only have a filtering circuit. The circuit of the filtering module 14 can be designed according to actual needs so as to meet the requirements of different applications.

The voltage converting module 15 is connected to the filtering module 14. In this embodiment, the voltage converting module 15 can be a boost converter. In another embodiment, the voltage converting module 15 can be a buck converter, a buck-boost converter, a flyback converter, or other similar components. In yet another embodiment, the voltage converting module 15 can be the combination of two or more of a boost converter, a buck converter, a buck-boost converter, and a flyback converter.

The lighting source module 16 is connected to the voltage converting module 15. In this embodiment, the lighting source module 16 can be a LED. In another embodiment, the lighting source module 16 can be a LED array or other similar components.

As previously stated, it is known that the harmonic suppressing module 12 is disposed between the input module 11 and the rectifying module 13. The harmonic suppressing module 12 has a special harmonic suppression circuit design, including an inductor L1, a capacitor C1, and a thermistor PT.

The inductance of the above inductor can be below 1 mH. For example, the inductance of the inductor L1 can range from 1000 nH to 1 mH. The inductor L1 has a surge current suppressing function to prevent damage to the functional modules of the lighting device 1 due to surge current. Additionally, the inductor L1 also has the characteristic of suppressing sudden changes in current, so the inductor L1 can effectively suppress harmonics. The higher the frequency of the harmonics, the better the harmonic suppression function of the inductor L1. Furthermore, the harmonic suppressing module 12 can use an inductor L1 having low inductance and of small size, which can significantly reduce the cost of the lighting device 1, and meets the requirements of radiation and conduction. Therefore, the application of the lighting device 1 can be more comprehensive in order to meet actual requirements. Moreover, the above inductor L1 does not affect the overall efficiency of the lighting device 1, allowing the lighting device 1 to achieve higher efficiency. Additionally, the inductor L1 can provide effective harmonic suppressing function. Therefore, the lighting device 1 can satisfy the requirements of different applications.

Furthermore, due to the inherent characteristics of the capacitor C1, direct current cannot pass through the capacitor C1, while alternating current can pass through the capacitor C1. Therefore, high-frequency harmonics will pass through the capacitor C1 and return to the neutral wire terminal Nt (return to the external power source PS).

When severe high-frequency harmonics occur, the resistance of the thermistor PT increases to consume high-frequency harmonics. Therefore, the harmonic suppressing module 12 can achieve an automatic adjustment harmonic suppressing mechanism, which can effectively suppress high-frequency harmonics to prevent the functional modules of the lighting device 1 from being influenced accordingly. Through the above circuit design, the service life of the lighting device 1 can be further extended, so the lighting device 1 can achieve higher reliability.

The lighting source module 16 of the lighting device 1 can be a LED, reducing the energy consumption of the lighting device 1 significantly, while achieving high efficiency. Therefore, the lighting device 1 can be more energy-saving so as to meet environmental protection requirements, so the lighting device 1 can comply with future development trends.

The embodiment just exemplifies the present invention and is not intended to limit the scope of the present invention; any equivalent modification and variation according to the spirit of the present invention is to be also included within the scope of the following claims and their equivalents.

It is worthy to point out that some currently available harmonic suppressing circuits usually adopt inductors disposed at the input ends thereof so as to achieve harmonic suppressing functions. However, these large inductors having high inductances significantly increase the overall costs of the circuits and cannot meet the requirements of radiation and conduction. Some currently available harmonic suppressing circuits relocate all capacitors before the rectifier to after the rectifier, which can to some extent suppress harmonic interference. However, if high-frequency harmonics pass through the rectifier, the diodes of the rectifier may be broken down due to overheating. In addition, some currently available harmonic suppressing circuits adopt active filters to eliminate harmonics, but this significantly increases the costs thereof. By contrast, according to one embodiment of the present invention, the lighting device having harmonic suppressing function includes an input module, harmonic suppressing module, a rectifying module, a filtering module, a voltage converting module and a light source module. The harmonic suppressing module is connected to the input module, and includes an inductor a capacitor and a thermistor. The rectifying module is connected to the harmonic suppressing module. The filtering module is connected to the rectifying module. The voltage converting module is connected to the filtering module. The light source module is connected to the voltage converting module. The harmonic suppressing module is disposed between the input module and the rectifying module. The above harmonic suppressing module is disposed between the input module and the rectifying module, and disposed before the rectifying module, so the harmonic suppressing module can effectively suppress harmonics to prevent damage to the functional modules of the lighting device. Therefore, the harmonic suppressing module can extend the service life of the lighting device and prevent unexpected accidents, such as fires, from being incurred.

According to one embodiment of the present invention, the harmonic suppressing module of the lighting device includes an inductor, a capacitor, and a thermistor. The inductor effectively suppresses high-frequency harmonics. When high-frequency harmonics pass through the inductor, the high-frequency harmonics return to the input module after passing through the capacitor and thermistor. If severe high-frequency harmonics are generated, the resistance of the thermistor increases to consume the high-frequency harmonics. This automatic adjustable harmonic suppression mechanism effectively suppresses the high-frequency harmonics in order to preventing the high-frequency harmonics from affecting the functional modules of the lighting device. As a result, the service life of the lighting device can be further extended, such that the lighting device can achieve higher reliability.

Also, according to one embodiment of the present invention, the inductance of the inductor in the harmonic suppressing module of the lighting device ranges from 1000 nH to 1 mH. Therefore, the inductance of the inductor of the harmonic suppressing module can be low, so the inductor can be of small size, which can significantly reduce the cost of the harmonic suppressing module, and conform to the requirements of radiation and conduction and allows. Accordingly, the lighting device can be more comprehensive in use and satisfy actual requirements.

Further, according to one embodiment of the present invention, the harmonic suppressing module of the lighting device can use an inductor with low inductance. Consequently, the inductor does not adversely affect the overall efficiency of the lighting device, such that the lighting device can achieve high effectiveness. Additionally, the inductor can provide an effective harmonic suppressing effect. Therefore, the lighting device can meet the requirements of different applications.

Moreover, according to one embodiment of the present invention, the lighting source module of the lighting device can be a light-emitting diode (LED), so the energy consumption of the lighting device can be reduced and the lighting device can also achieve high efficiency. Thus, the lighting device can be more energy-saving in order to meet environmental protection requirements and conform to future development trends.

Furthermore, according to one embodiment of the present invention, the circuit design of the lighting device is simple, so the lighting device can achieve the desired technical effects while effectively reducing the cost thereof. Therefore, the lighting device can have high practicality and meet the needs of different users. As set forth above, the lighting device according to the embodiments of the present invention can definitely achieve great technical effects.

Figure 3:
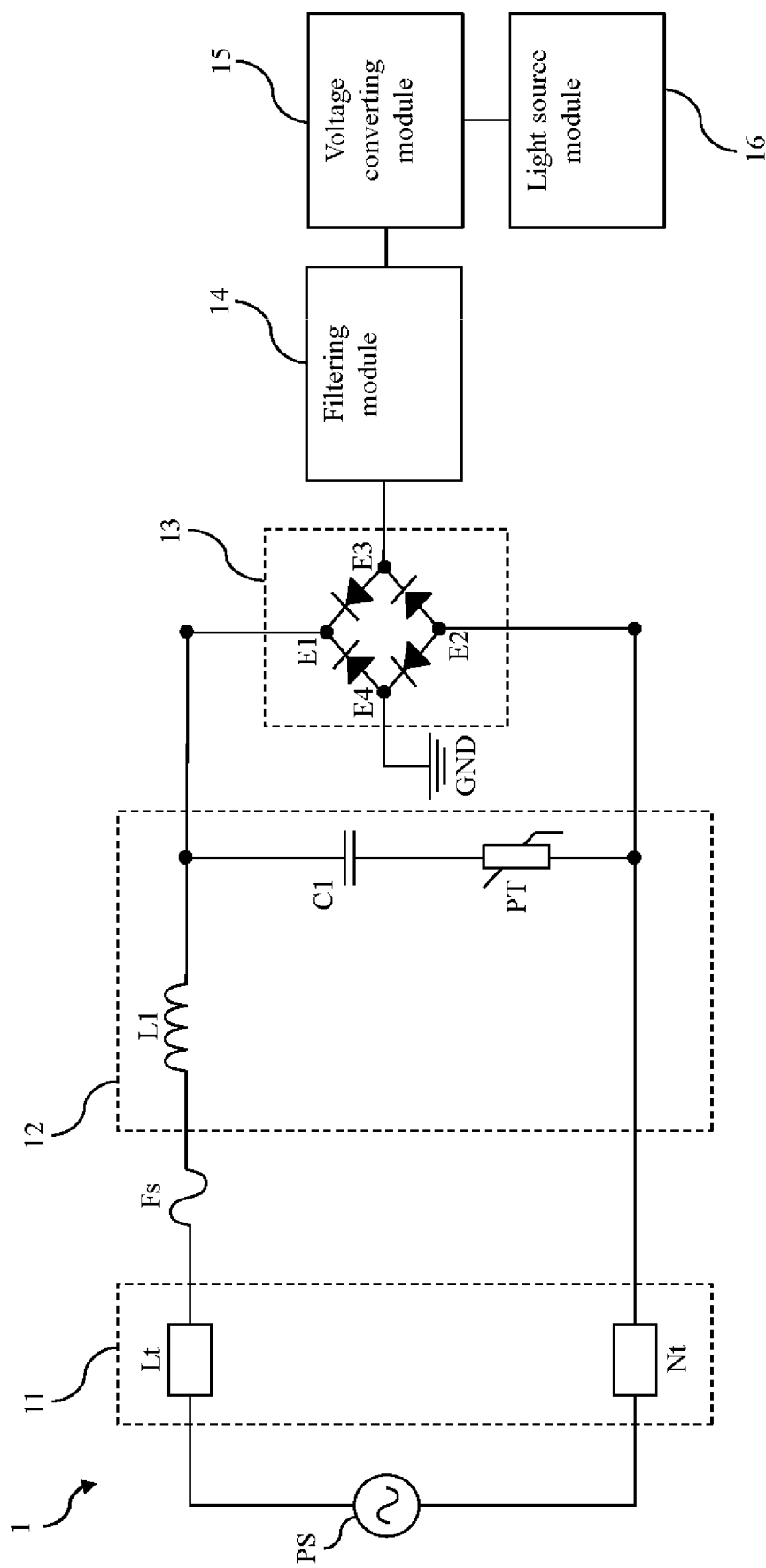
FIG. 3 is the circuit diagram of the circuit structure of the lighting device with harmonic suppression function in accordance with the third embodiment of the present invention.

Please refer to FIG. 3, which is the circuit diagram of the circuit structure of the lighting device with harmonic suppression function in accordance with the third embodiment of the present invention. As shown in FIG. 3, the lighting device 1 includes an input module 11, a harmonic suppressing module 12, a rectifying module 13, a filtering module 14, a voltage converting module 15, and a lighting source module 16.

The input module 11 includes a live wire terminal Lt and a neutral wire terminal Nt, connected to an external power source PS, which is, in this embodiment, a utility power. In another embodiment, the external power source PS may be a generator or a similar component.

The harmonic suppressing module 12 is connected to the input module 11 and includes an inductor L1, a capacitor C1, and a thermistor PT. One end of the inductor L1 is connected to the live wire terminal Lt, and the other end is connected to a first node N1. The first node N1 is connected to one end of the capacitor C1. The other end of the capacitor C1 is connected to one end of the thermistor PT, and the other end of the thermistor PT is connected to a second node N2. The second node N2 is connected to the neutral wire terminal Nt. The thermistor PT may be a PTC thermistor or a component whose resistance increases with temperature. The capacitance of the capacitor C1 can be adjusted based on the power of the lighting source module 16. The capacitance (nF) of the capacitor C1 is approximately 10 times the power (W) of the lighting source module 16. For example, if the power of the lighting source module 16 is 10 W, the capacitance of the capacitor C1 is approximately 100 nF. If the power is 20 W, the capacitance is approximately 220 nF or below 220 nF. If the power is 50 W, the capacitance is approximately 470 nF or below 470 nF.

The rectifying module 13 can be a bridge rectifier. The rectifying module 13 has a first end E1, a second end E2, a third end E3 and a fourth end E4. The first end E1 is connected to the first node N1, the second end E2 is connected to the second node N2, the third end E3 is connected to the filtering module 14, and the fourth end N4 is connected to the grounding point GND.

The filtering module 14 is connected to the rectifying module 13 and may include a filtering circuit, electromagnetic compatibility (EMC) circuit, and other necessary circuits. In another embodiment, the filtering module 14 may only have a filtering circuit. The circuit of the filtering module 14 can be designed according to actual requirements so as to meet the requirements of different applications.

The voltage converting module 15 is connected to the filtering module 14. In this embodiment, the voltage converting module 15 can be a boost converter. In another embodiment, the voltage converting module 15 can be a buck converter, buck-boost converter, flyback converter, or another similar component. In yet another embodiment, the voltage converting module 15 can be the combination of any two or more of the boost converter, buck converter, buck-boost converter, and flyback converter.

The lighting source module 16 is connected to the voltage converting module 15. In this embodiment, the lighting source module 16 can be an LED. In another embodiment, the lighting source module 16 can be a LED array or other similar components.

The components mentioned above are similar to those in the previous embodiments and are not further described herein again. The difference between this embodiment and the previous embodiment is that the lighting device 1 includes a fuse Fs. The harmonic suppressing module 12 is connected to the input module 11 through the fuse Fs (one end of the inductor L1 of the harmonic suppressing module 12 is connected to the live wire terminal Lt of the input module 11).

Similarly, the lighting device 1 includes an input module 11, a harmonic suppressing module 12, a rectifying module 13, a filtering module 14, a voltage converting module 15, and a lighting source module 16. The harmonic suppressing module 12 is connected to the input module 11. The rectifying module 13 is connected to the harmonic suppressing module 12. The filtering module 14 is connected to the rectifying module 13. The voltage converting module 15 is connected to the filtering module 14. The lighting source module 16 is connected to the voltage converting module 15. The harmonic suppressing module 12 is disposed between the input module 11 and the rectifying module 13. The above harmonic suppressing module 12 is disposed before the rectifying module 13, which can effectively suppress harmonics to prevent damage to the functional modules of the lighting device 1. Consequently, the harmonic suppressing module 12 can extend the service life of the lighting device 1 and prevents accidents, such as fires.

In addition, the harmonic suppressing module 12 of the lighting device 1 includes an inductor L1, a capacitor C1, and a thermistor PT. The above inductor L1 effectively suppresses high-frequency harmonics. When high-frequency harmonics pass through the inductor L1, they return to the input module 11 through the capacitor C1 and the thermistor PT. In cases of severe high-frequency harmonics, the resistance of the thermistor PT increases to dissipate high-frequency harmonics. The automatic adjustable harmonic suppression mechanism described above effectively suppresses high-frequency harmonics, preventing them from affecting the functional modules of the lighting device 1. Consequently, the service life of the lighting device 1 can be further extended, so the lighting device 1 can achieve high reliability.

The embodiment just exemplifies the present invention and is not intended to limit the scope of the present invention; any equivalent modification and variation according to the spirit of the present invention is to be also included within the scope of the following claims and their equivalents.

According to one embodiment of the present invention, the lighting device having harmonic suppressing function includes an input module, harmonic suppressing module, a rectifying module, a filtering module, a voltage converting module and a light source module. The harmonic suppressing module is connected to the input module, and includes an inductor a capacitor and a thermistor. The rectifying module is connected to the harmonic suppressing module. The filtering module is connected to the rectifying module. The voltage converting module is connected to the filtering module. The light source module is connected to the voltage converting module. The harmonic suppressing module is disposed between the input module and the rectifying module. The above harmonic suppressing module is disposed between the input module and the rectifying module, and disposed before the rectifying module, so the harmonic suppressing module can effectively suppress harmonics to prevent damage to the functional modules of the lighting device. Therefore, the harmonic suppressing module can extend the service life of the lighting device and prevent unexpected accidents, such as fires, being incurred.

To sum up, according to one embodiment of the present invention, the harmonic suppressing module of the lighting device includes an inductor, a capacitor, and a thermistor. The inductor effectively suppresses high-frequency harmonics. When high-frequency harmonics pass through the inductor, the high-frequency harmonics return to the input module after passing through the capacitor and thermistor. If severe high-frequency harmonics are generated, the resistance of the thermistor increases to consume the high-frequency harmonics. This automatic adjustable harmonic suppression mechanism effectively suppresses the high-frequency harmonics in order to preventing the high-frequency harmonics from affecting the functional modules of the lighting device. As a result, the service life of the lighting device can be further extended, such that the lighting device can achieve higher reliability.

Also, according to one embodiment of the present invention, the inductance of the inductor in the harmonic suppressing module of the lighting device ranges from 1000 nH to 1 mH. Therefore, the inductance of the inductor of the harmonic suppressing module can be low, so the inductor can be of small size, which can significantly reduce the cost of the harmonic suppressing module, and conform to the requirements of radiation and conduction and allows. Accordingly, the lighting device can be more comprehensive in use and satisfy actual requirements.

Further, according to one embodiment of the present invention, the harmonic suppressing module of the lighting device can use an inductor with low inductance. Consequently, the inductor does not adversely affect the overall efficiency of the lighting device, such that the lighting device can achieve high effectiveness. Additionally, the inductor can provide an effective harmonic suppressing effect. Therefore, the lighting device can meet the requirements of different applications.

Moreover, according to one embodiment of the present invention, the lighting source module of the lighting device can be a light-emitting diode (LED), so the energy consumption of the lighting device can be reduced and the lighting device can also achieve high efficiency. Thus, the lighting device can be more energy-saving in order to meet environmental protection requirements and conform to future development trends.

Furthermore, according to one embodiment of the present invention, the circuit design of the lighting device is simple, so the lighting device can achieve the desired technical effects while effectively reducing the cost thereof. Therefore, the lighting device can have high practicality and meet the needs of different users.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having harmonic suppressing function, comprising:
   an input module comprising a live wire terminal and a neutral wire terminal;
   a harmonic suppressing module connected to the input module, and comprising an inductor a capacitor and a thermistor;
   a rectifying module connected to the harmonic suppressing module;
   a filtering module connected to the rectifying module;
   a voltage converting module connected to the filtering module; and
   a light source module connected to the voltage converting module;
   wherein the harmonic suppressing module is disposed between the input module and the rectifying module, wherein one end of the inductor is connected to the live wire terminal and another end of the inductor is connected to a first node, wherein the first node is connected to one end of the capacitor and the rectifying module, and another end of the capacitor is connected to one end of the thermistor, wherein another end of the thermistor is connected to a second node, and the second node is connected to the neutral wire terminal and the rectifying module.

2. The lighting device having harmonic suppressing function as claimed in claim 1, wherein an inductance of the inductor is between 1000 nH and 1 mH.

3. The lighting device having harmonic suppressing function as claimed in claim 1, wherein the rectifying module has a first end, a second end, a third end and a fourth end, wherein the first end is connected to the first node, the second end is connected to the second node, the third end is connected to the filtering module, and the fourth end is connected to a grounding point.

4. The lighting device having harmonic suppressing function as claimed in claim 1, wherein the input module is connected to an external power source.

5. The lighting device having harmonic suppressing function as claimed in claim 1, wherein the light source module is a light-emitting diode or a light-emitting diode array.

6. The lighting device having harmonic suppressing function as claimed in claim 1, wherein the harmonic suppressing module is connected to the input module via a fuse.

7. The lighting device having harmonic suppressing function as claimed in claim 1, wherein the voltage converting module is a boost converter, a buck converter, a buck-boost converter or a flyback converter.

8. The lighting device having harmonic suppressing function as claimed in claim 1, wherein the voltage converting module is one of a boost converter, a buck converter, a buck-boost converter and a flyback converter, or a combination of two or more of the boost converter, the buck converter, the buck-boost converter and the flyback converter.

* * * * *